United States Patent [19]

Incorvia, Jr. et al.

[11] Patent Number: 5,891,364
[45] Date of Patent: Apr. 6, 1999

[54] CORROSION INHIBITORS FOR CEMENT COMPOSITIONS

[75] Inventors: Michael J. Incorvia, Jr., Lansdale, Pa.; Robert W. Chobin, Jr., Lebanon, N.J.; Tim Hegge, Jr., Harleysville, Pa.

[73] Assignee: Geo Specialty Chemicals, Inc., Cleveland, Ohio

[21] Appl. No.: 678,527

[22] Filed: Jul. 9, 1996

[51] Int. Cl.$^6$ .............. C09K 3/00; C04B 9/02; C23F 11/00

[52] U.S. Cl. .......... 252/392; 252/394; 252/396; 106/14.14; 106/14.18; 106/14.35; 106/14.42; 422/7; 422/16; 422/17

[58] Field of Search ............ 252/392, 394, 252/396; 106/14.14, 14.18, 14.35, 14.42; 422/7, 16, 17

[56] References Cited

U.S. PATENT DOCUMENTS

| | | | |
|---|---|---|---|
| 3,210,207 | 10/1965 | Dodson et al. | 106/90 |
| 3,427,175 | 2/1969 | Angstadt et al. | 106/89 |
| 3,801,338 | 4/1974 | Whitaker | 106/90 |
| 3,907,578 | 9/1975 | Scherrer et al. | 106/14 |
| 3,976,494 | 8/1976 | Kudo | 106/14 |
| 4,285,733 | 8/1981 | Rosenberg et al. | 106/98 |
| 4,442,021 | 4/1984 | Burge et al. | 252/389 R |
| 4,547,224 | 10/1985 | Schilling | 106/273 |
| 4,738,994 | 4/1988 | Weiss | 523/401 |
| 5,226,956 | 7/1993 | Askew et al. | 106/14.05 |
| 5,262,089 | 11/1993 | Bobrowski et al. | 252/396 |
| 5,372,643 | 12/1994 | Gosset et al. | 106/808 |
| 5,599,481 | 2/1997 | Walger | 252/358 |
| 5,641,352 | 6/1997 | Jeknavorian et al. | 106/808 |

FOREIGN PATENT DOCUMENTS 52-108915  9/1977  Japan .............. C07C 43/10

OTHER PUBLICATIONS

"Cement," Encyclopedia of Chemical Technology (Kirk–Othmer; eds, John Wiley & Sons, Inc., NY, NY, 5th ed., 1993) vol. 5, pp. 564–598.

ACI Manual of Concrete Practice, Part 1 –1995 (American Concrete Institute, Detroit, MI 48219).

Encyclopedia of Polymer Science and Technology, vol. 10, pp. 597–615 (John Wiley & Sons, NY, NY 1969).

Encyclopedia of Polymer Science and Engineering, vol. 6, pp. 254–259 (John Wiley & Sons, NY, NY 1986).

*Primary Examiner*—C. H. Kelly
*Attorney, Agent, or Firm*—Thompson Hine & Flory LLP

[57] ABSTRACT

Compositions and methods relating to cementitious compositions are provided. The addition of an amidoamine that is the reaction product of polyalkylenepolyamines and short-chain alkanedioic acids or reactive derivatives thereof to cementitious compositions has been found useful in inhibiting the corrosion of ferrous metal articles in contact with said composition. The amidoamine is advantageously employed in combination with a hydrophobe compound that enhances corrosion inhibition. The invention also provides aqueous emulsions which contain the amidoamine, one or more hydrophobes, and an emulsifier for the hydrophobe.

44 Claims, No Drawings

CORROSION INHIBITORS FOR CEMENT COMPOSITIONS

FIELD OF THE INVENTION

This invention relates to corrosion inhibitors useful as additives to cement compositions for inhibiting the corrosion of steel reinforcing structures in contact therewith.

BACKGROUND ART

Concretes formed from hydraulic cements, of which Portland cement is the most common example, are used as structural components in various applications, such as in the formation of roads, bridge deckings, building structures, multi-story automobile storage structures and the like. In order to enhance the properties of the concrete to permit its use in these structures, the material normally is used in combination with iron or steel reinforcing structures therein. These reinforcing metal structures, usually in the form of metal rods or bars, are subjected to attack by the various corrosive elements contained in the concrete, as well as by the application of external corrosive elements to the structure, such as chloride salts and the like, which are commonly used in the removal of ice and snow from roads, bridges, pedestrian walkways and the like. Further, various structures located at coastal installations and the like are subject to corrosive salt attack from the marine environment. The repair and replacement of such structures which have deteriorated due to the effects of such corrosive forces is extensive and in certain instances requires complete replacement of the structure as unsuitable for its intended use.

In attempts to counteract the corrosive effects normally encountered by concrete structures, as discussed above, various corrosion inhibiting agents have been proposed for use as admixtures to be used in their formation.

U.S. Pat. No. 3,210,207 (Dodson et al.) discloses the use of mixes of calcium formate with minor amounts of certain benzoate, nitrite or chromate salts as corrosion inhibitors, to be used as accelerators in cements.

U.S. Pat. No. 3,427,175 (Angstadt et al.) discloses the use of calcium nitrite as an accelerator which partially inhibits corrosion in alite cements. The calcium nitrite may contain minor amounts of sodium nitrite and may be used with calcium chloride and other accelerators.

U.S. Pat. No. 3,801,338 (Whitaker) discloses the use of a mixture of calcium formate and sodium nitrite, optionally with triethanolamine or sodium benzoate, for adding to cement which is to contain metal reinforcement. Improved compressive strength is taught, together with sulfate resistance, and a positive corrosion inhibition effect.

U.S. Pat. No. 3,976,494 (Kudo et al.) discloses a process for inhibiting corrosion of iron or steel placed in cement which comprises adding to the cement a nitrite and an ester of phosphoric acid and/or an ester of boric acid.

U.S. Pat. No. 4,285,733 (Rosenberg et al.) discloses the addition of at least about 2% calcium nitrite to concrete to inhibit the corrosion of metal pieces contained therein.

U.S. Pat. No. 5,262,089 (Bobrowski et al.) discloses an admixture for inhibiting chloride-induced corrosion in steel reinforcing in place in concrete comprises an oil-in-water emulsion wherein the oil phase comprises an unsaturated fatty acid ester and ethoxylated nonyl phenol and the ester of an aliphatic carboxylic acid with a mono-, di- or trihydric alcohol and the water phase comprises a saturated fatty acid, an amphoteric compound, a glycol and a soap. The admixture is added to the concrete prior to placement.

U.S. Pat. No. 4,442,021 (Burge et al.) discloses that corrosion protection of metallic articles within concrete structures can be accomplished by coating the articles with a coating comprising an aqueous suspension of 10–99.99% of hydraulic binding agents, preferably cement or mixtures thereof with latent hydraulic additives, and 0.01–10% corrosion inhibitors. The coating is applied onto the metallic articles intended to be enclosed in concrete structures.

SUMMARY OF THE INVENTION

This invention relates to a method of making a corrosion inhibitor useful in cementitious compositions comprising mixing a major amount by weight of an amidoamine corrosion inhibitor with a minor amount by weight of a surfactant, the resulting mixture being at an elevated temperature, preferably at least about 100° C., during said mixing. The method also typically comprises diluting the resulting mixture with water and adding a hydrophobe to the resulting diluted mixture.

DETAILED DESCRIPTION OF THE INVENTION

The amidoamines useful in this invention can be described as oligomeric polyamides having primary amine functionality and which are the reaction product of polyalkylenepolyamines and short-chain alkanedioic acids or reactive derivatives thereof. The reaction product will typically be a complex mixture, but will also typically contain amidoamines represented by the formula:

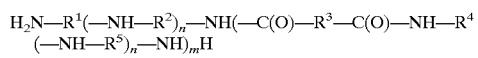

$$H_2N—R^1(—NH—R^2)_n—NH(—C(O)—R^3—C(O)—NH—R^4(—NH—R^5)_n—NH)_mH$$

wherein $R^1$, $R^2$, $R^3$, $R^4$, and $R^5$ are alkylene radicals and n and m are integers (for pure compounds) independently selected from about 1 to about 20, more typically from about 1 to about 5. Of course, for mixture of compounds, n and m can be fractions or complex numbers which represent averages for the mixture. When m is greater than 1, each $R^3$ can be the same alkylene group or, if a mixture of alkanedioic acids are employed, the $R^3$ groups in a given compound can be different alkylene groups. The reaction product will typically be comprised predominantly (i.e. at least 50% by weight of the reaction product) of amines of the above formula. In addition to amines of the above formula, amines having a similar formula, but wherein a portion of the secondary amine groups of the polyalkylenepolyamine have reacted with the carboxyl group of the alkanedioic acid reactant, may also be present. Further, amines of the above formula may also self-condense to form substituted imidazolines that will typically be present in the reaction mixture. Because the reaction is typically run with a stoichiometric excess of polyalkylenepolyamine, there will also typically be unreacted polyalkylenepolyamine in the product.

The reaction mixture can also be treated with an alkylating agent, e.g. methyl chloride, dimethyl sulfate, etc., to convert at least a portion (e.g. from 1% to about 25%) of the amine nitrogen functionality of the amidoamine to a quaternary amine. Preferred amidoamines are un-quaternized.

Polyalkylenepolyamines which can be used according to the invention are those which have two primary amine groups and at least one secondary amine group. The amidoamines are typically prepared from polyalkylenepolyamines of the formula $H_2N—R(—NH—R)_n—NH_2$ wherein n is 1 to 20, more typically from 1 to 5, and R is an alkylene group. Typically R contains 2 to 8 carbon atoms and the total carbon atoms of the polyamine typically do not exceed 12. The polyalkylenepolyamines have at least one secondary amine group. Examples of polyalkylenepolyamines include diethylenetriamine, triethylenetetramine, tetraethylenepentamine, pentaethylenehexamine, dipropylenetriamine, tributylenetetramine, dihexamethylenetriamine and the like. The more preferred polyalkylenepolyamines are the polyethylene polyamines with the most preferred being triethylenetetramine and diethylenetriamine.

The amidoamines are prepared from short-chain alkanedioic acids or reactive derivatives thereof, e.g. the di-lower alkyl (e.g. $C_1$–$C_3$) esters of said alkanedioic acid. The short-chain alkanedioic acids are to be distinguished from dimer acids, and generally have less than about 22 carbon atoms. The short-chain alkanedioic acid typically has from 2 to 14 carbon atoms, and more typically has from 3 to 10 carbon atoms. Especially useful short-chain alkanedioic acids will have 4 to 8 carbon atoms and examples include succinic, glutaric and adipic acids. Also useful are saturated acids having 9 to 12 carbon atoms, e.g. azelaic acid and sebacic acid. The dicarboxylic acid esters which are typically used in the process according to the invention are those which are $C_{1-3}$ diesters of $C_{1-10}$ dicarboxylic acids. Such diesters can be made for example, by direct esterification of a dicarboxylic acid, e.g. those having from 1 to 10 carbon atoms with an alcohol, e.g. those having from 1 to 3 carbon atoms. Examples of such esters of short-chain alkanedioic acids are dimethyl malonate, dimethyl succinate, dimethyl glutarate, dimethyl adipate, dimethyl pimelate, dimethyl azelate, and dimethyl sebacate. Mixtures of any or all of such esters can also be used in the process according to the invention. Preferably, the esters are mixtures of dimethyl adipate and dimethyl glutarate which are sold as DBE-3™, a product of the DuPont Corporation.

The aminoamide can be made by a process whose first step is the aminolysis of an ester. A $C_{1-3}$ dialkyl ester of a saturated aliphatic dicarboxylic acid having from 3 to 10 carbon atoms is heated with a polyalkylenepolyamine having two primary amine groups and at least one secondary amine group in the absence of water. The polyalkylenepolyamine to ester molar ratio should be greater than 1:1 to ensure that the product is essentially completely amine functional and to ensure that the product is an oligomer rather than a high polymer. Typically, the molar ratio of polyalkylenepolyamine to ester will range from about 1.1: to about 5:1, more typically from about 1.3:1 to about 2:1. Using these mole ratios, the product will typically be comprised predominantly (i.e. at least 50% by weight) of compounds described by the above formula wherein m is 2–12, more typically wherein m is 2–5.

During the heating step, the reaction temperature first reaches a maximum of about 150° C.–160° C. at which point the alcohol formed as a result of the reaction between the diester and the polyalkylenepolyamine begins to boil. The alcohol is retained in the reaction by refluxing it which also lowers the reaction temperature. After the temperature drops to about 110° C.–115° C., the alcohol is removed from the reaction at a temperature of from about 110° C. to about 160° C. The alcohol removal is continued until the reaction mixture is substantially free of ester functionality.

The molar ratio of polyalkylenepolyamine to ester in the aminolysis step should be greater than 1:1. Values less than 1:1 will result in gelation of the reaction product. Typically, the molar ratio of polyalkylenepolyamine to alkanedioic acid or reactive derivative thereof is from about 1.3:1 to about 4:1, more typically from about 1.5:1 to about 3:1, and even more typically from about 1.5:1 to about 2.5:1.

Preferably, the ester-polyalkylenepolyamine reaction mixture is heated at atmospheric pressure in a reaction vessel equipped with a reflux condenser until the temperature first reaches a value of about 150° C.–160° C. during which time the alcohol formed in the reaction begins to reflux. The alcohol generated lowers the boiling point of the reaction mixture and the temperature continuously falls as more and more alcohol is produced. When the reaction temperature drops to about 110° C., the alcohol is removed at a temperature in the range of from about 110° C. to about 160° C. The alcohol removal can be accomplished by changing the condenser configuration from reflux to take-off. Alcohol is continuously removed until the reaction product is essentially free of ester functionality.

When the molar ratio of polyalkylenepolyamine to alkanedioic acid or reactive derivative thereof is greater than 1.4:1, it is believed that the reaction product itself is novel. Thus, this invention also relates to compositions which are the reaction product of polyalkylenepolyamine and an alkanedioic acid or reactive derivative thereof, wherein the molar ratio of polyalkylenepolyamine to alkanedioic acid or reactive derivative thereof is greater than 1.4:1. Typically, the molar ratio of polyalkylenepolyamine to alkanedioic acid or reactive derivative thereof is greater than about 1.5:1, more typically greater than about 1.6:1, and even more typically greater than about 1.7:1.

The aminoamide composition may be added to a cementitious composition, e.g. a cement or a concrete mix, at any convenient point during its preparation, after which point substantial mixing will take place. The aminoamide may be added to the water in which the cement, sand and/or gravel are mixed. The cement may be premixed with water and then either a neat or aqueous aminoamide composition may be added. In general, either a neat or aqueous aminoamide composition may be added to the cement, mortar or concrete mix at any stage prior to final mixing of the cementitious composition.

Cementitious compositions are cements, mortars, or concrete mixes which include concretes, mortars, neat paste compositions, oil well cement slurries, grouting compositions and the like. Cementitious compositions are discussed in the encyclopedia article "Cement" cited below. The cements used in the preparation of the cementitious compositions, especially concrete mixes, include Type I, II and III cements. These cements are well known and are described in "Cement", *Encyclopedia of Chemical Technology*, (Kirk-Othmer, eds, John Wiley & Sons, Inc., N.Y., N.Y., 5th ed., 1993), vol. 5, pp. 564–598, the disclosure of which is incorporated by reference herein. Portland cement is by far the most widely used hydraulic cement. The term "hydraulic cement" as used herein includes those inorganic cements which, when mixed with water, set and harden as a result of chemical reactions between the water and the compounds present in the cement. The term "Portland cements" as used herein includes those products prepared by heating a mixture of limestone and clay or shale, or other calcareous and argillaceous materials to a fused state and grinding the fused product, which is called clinker, with a few percent, normally about 4 to 6 percent, of a retarder such as gypsum. The term "concrete" as used herein includes a mixture of such hydraulic cements and inert aggregates. Typical aggregates include conventional aggregates such as gravel, sand, granite, limestone, and quartz. Conventional hydraulic cement concretes, e.g. Portland cement concretes, employ major amounts, i.e. over 50%, usually up to about 75% by volume of such aggregates in the set product. Pozzolanic materials such as condensed silica fume and fly ash may also be included. The cements may be used to prepare concrete mixes typically containing 100 parts by weight of cement, from about 140 to about 260 parts by weight of sand, from about 100 to about 200 parts by weight of gravel, from about 20 to about 80 parts by weight of water and an amount of the aminoamide composition of the invention effective to inhibit the corrosion of ferrous metal articles placed into the cementitious composition prior to curing thereof. Typical concrete mixes contain 100 parts by weight of cement, from about 160 to about 240 parts by weight of sand, from about 120 to about 180 parts by weight of gravel, from about 35 to about 60 parts by weight of water and from about 0.1 to about 5 parts by weight of the aminoamide composition of this invention. Further information on the formulation and processing of concrete is found in the *ACI Manual of Concrete Practice Part 1—1995*, (American Concrete Institute, Detroit, Mich., 1995) the disclosure of which is incorporated herein by reference.

The concentration of aminoamide composition of this invention in the cementitious composition may vary, but will generally be less than about 5%, typically from about 0.1% to about 3%, and preferably from about 0.5% to about 1.5% (by weight of cement). After preparation, these cementitious compositions are then allowed to harden to obtain a hardened cement mass.

In preferred embodiments of this invention, one or more hydrophobes are also present in the cementitious composition along with the aminoamide composition of the invention. Useful hydrophobes are organic compounds having at least 6 carbon atoms, typically from about 10 to 50, more typically from about 12 to about 40 carbon atoms. The hydrophobe will also typically have essentially no hydrophilic groups such that the HLB of the hydrophobe will typically be less than about 6, more typically less than about 4, even more typically less than about 1.5, and most typically less than about 1.0. Typical hydrophobes are primary, secondary or tertiary amines, fatty acid esters, fatty acid amides, and fatty alcohols wherein the compound contains no ionic groups, e.g. carboxylates, sulfonates, quaternary amines, or the like, or hydrophilic polyether groups, e.g. polyoxyethylenes. Examples of hydrophobes include the methyl esters of soybean oil fatty acids, tallow fatty acid, tall oil fatty acids, coconut oil fatty acids, lauric acid, caprylic acid, oleic acid, isostearic acid and dimer fatty acids. Other examples include the amino-functional fatty polyamides or fatty aminoamides as described in *The Encyclopedia of Polymer Science and Technology*, vol. 10, pp. 597–615 (John Wiley & Sons, Inc, N.Y., N.Y., 1969) the disclosure of which is incorporated herein by reference. These amino-functional polyamides or fatty aminoamides are the reaction product of a polymeric fatty acid, e.g. a mixture comprised predominantly of a $C_{36}$ dimer acid, a fatty mono-acid (as a chain stopper to limit the molecular weight) and a polyalkylenepolyamine. Typically, the amino-functional polyamide will be a liquid fatty polyamide with an amine number of 200 to 600, more typically from about 300 to about 500 and even more typically from about 350 to about 400.

Preferred hydrophobes are mono-, di-, or tri-alkyl amines, e.g. tri-laurylamine. Preferred amines have at least about 12 total carbon atoms. The preferred amines are tri-alkyl fatty amines wherein each fatty alkyl group has at least 6 carbon atoms, more preferably from about 8 to about 22 carbon atoms each, and more typically from about 10 to about 14 carbon atoms each. Mixtures of any of the above compounds may also be used as hydrophobes.

The relative amounts of amidoamine and hydrophobe may vary broadly, but the amidoamine will generally be present in a greater amount by weight than the hydrophobe. Typically, the hydrophobe will be present in an amount of about 0.01% to about 40% by weight of the amidoamine, more typically from about 0.1% to about 10%, and preferably from about 1% to about 5%.

The amidoamine and the hydrophobe can be added to the cementitious composition separately or they can be pre-mixed to form a blend composition. The blend can be used either as a neat blend or as an aqueous dispersion or emulsion of the components. Efficient dispersion of the blend in water at relatively low blend solids, e.g. 20% to 50% blend solids, facilitates dispersion of the blend throughout the cementitious composition. Thus, the blend is preferably added to the cementitious composition as an aqueous dispersion which contains typically roughly equal amounts by weight of water and aminoamide and a minor amount by weight of the blend of a hydrophobe and a dispersant therefor.

It has been found that the preferred hydrophobes, i.e. the fatty tri-alkyl amines, can be difficult to emulsify. It has been further found that the use of a second hydrophobe which is easier to disperse, e.g. an amino-functional fatty polyamide or fatty aminoamide, is beneficial. The fatty tri-alkyl amine can be pre-mixed with the amino-functional fatty polyamide or fatty aminoamide before mixing of the hydrophobes with water.

The first step in the method of this invention is mixing the amidoamine with a surfactant. The surfactant can be any composition effective to disperse the desired amount of hydrophobe in the water. Examples of surfactants include nonionics, e.g. block copolymers of propylene and ethylene oxides, ethoxylated nonylphenols, ethoxylated fatty alcohols, anionics, e.g. fatty alcohol sulfates, and cationics, e.g. fatty alkyl quaternary amines.

The preferred surfactants are nonionic surfactants, i.e. compounds which contain a hydrophobic group and an nonionic hydrophilic group, typically a polyoxyethylene group. Examples of non-ionic surfactants include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 (more typically from about 20 to about 50) moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, analogous ethylene oxide condensates of long-chained secondary alcohols such as mixtures of C11 to C15 secondary alcohols; ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections.

Preferred surfactants are block copolymers of ethylene and propylene oxides, e.g. the PLURONIC® brand of block copolymers of propylene and ethylene oxide available from BASF Corp., particularly those in the PLURONIC® "F" series. In these preferred copolymers, the molecular weight (e.g. weight average) ranges from about 4,000 to about 15,000 and the percentage by weight of the copolymer derived from ethylene oxide ranges from about 60% to about 90%, more typically from about 65% to about 85%. These copolymers are described in *Encyclopedia of Polymer Science and Engineering*, vol. 6, pp. 254–259 (John Wiley & Sons, Inc., N.Y., N.Y., 1986), the disclosure of which is incorporated by reference. Examples of typical such copolymers are those wherein the molecular weight of the polyoxypropylene hydrophobe is from about 950 to 4000, more typically from about 1750 to about 3250, and wherein the polyoxyethylene hydrophile is about 10% to 80%, more typically from about 30% to 80% by weight of the copolymer. The preferred surfactant is a block copolymer of propylene oxide and ethylene oxide having from about 75% to about 85% polyoxyethylene and a molecular weight of about 10,000 to about 13,000, e.g. PLURONIC® F88 which has a molecular weight of about 11,250 and is about 80% polyoxyethylene and 20% by weight polyoxypropylene. Techniques to prepare suitable polyoxyalkylene polyol reactants are known in the art, and include reacting a hydroxyl group containing initiator, e.g. water, or a diol, e.g. propylene glycol, with propylene oxide, followed by reaction of the polyoxypropylene glycol with ethylene oxide.

The amount of dispersant will typically be small in comparison to the other components, e.g. from about 0.01% to about 5% by weight of the amidoamine, more typically from about 0.05% to about 1.0%.

In the method of making the dispersion, it is important that the amidoamine and surfactant be mixed at an elevated temperature. Typically, the temperature of the resulting mixture will be at least about 100° C., more typically from about 105° C. to about 115° C. To avoid the flash of water vapor or the need to pressurize the vessel, the surfactant is typically in neat form when mixed with the amidoamine. Water is then added to the resulting mixture and one or more hydrophobes are then added to the resulting aqueous mixture. The mixture is typically allowed to cool below about 100° C. before the addition of water to avoid the flash of water vapor or the need to pressurize the vessel. The temperature of the aqueous mixture when the hydrophobe is added is not critical and will typically be at ambient temperature after the addition of water. The hydrophobes are typically added to the aqueous mixture in small, successive portions, and more typically are added continuously at a rate of about 0.0001 to about 0.01 parts by weight of per 1 part of aqueous mixture per minute.

While the primary use of the aminoamides of this invention is as an additive to a cementitious composition to inhibit the corrosion of ferrous metal articles placed therein, the aminoamide should be useful as a corrosion inhibitor for ferrous metal articles in other fields of application, e.g. in petroleum production and/or processing, in protective coatings, and the like.

For a fuller understanding of the nature and advantages of this invention, reference may be made to the following examples. These examples are given merely to illustrate the invention and are not to be construed in a limiting sense. While the invention has been described with reference to certain specific embodiments thereof, it is understood that it is not to be so limited since alterations and changes may be made therein which are within the full intended scope of the appended claims. In this specification and the appended claims, all quantities, proportions and percentages are by weight (with a "major amount" referring to at least 50% by weight and a "minor amount" referring to less than 50% by weight) and all references to temperature are °C. unless otherwise indicated.

EXAMPLES

Example 1

The synthetic procedure for an aminoamide is as follows. Charge a 1 liter resin kettle, fitted with a mechanical stirrer, a thermocouple, and a distilling receiver with a condenser, with 346 g of DuPont DBE-3 (89 wt % dimethyl adipate, 10 wt % dimethyl glutarate, 0.2 wt % dimethyl succinate, and 0.05 wt % methanol, and 0.04 wt % water) and 412 g diethylenetriamine. Maintain a dry nitrogen gas atmosphere over the reaction mixture. Heat the mixture up to reflux (approximately 150° C.) and hold at reflux, the reflux temperature will decrease as the reactants are converted to products. After approximately 20 minutes of reflux, begin collecting the methanol distillate. The temperature of the reaction mixture will rise as the methanol is collected, maintain the reaction temperature so as not to exceed 150° C. Typically 90% of the theoretically excepted methanol (115 g) can be collected by a simple distillation, the remaining 10% can be collected by either a nitrogen sweep or reduced pressure distillation. The final product is a yellow paste at room temperature. The final product typically contains less than 0.1 wt % free methanol, free diethylenetriamine of 25 wt % or less, and free dimethyl esters of 0.2 wt % or less.

Example 2

The above synthesis of Example 1 is repeated, but the amount of diethylenetriamine is reduced to obtain a molar ratio of diethylenetriamine to total diester of 1.3:1. The final product is an extremely viscous, yellow liquid which barely flows at room temperature. The final product has around 1 0%(w/w) or less free diethylenetriamine.

Example 3

A concrete can be made by adding 10 g of a 50% aqueous solution of the product of Example 1 to a concrete consisting of water, 260 g (12.25%); cement, Portland type 1,500 g (23.55%); and Ottawa Sand 1,363 g (64.20%).

Example 4

A concrete can be made by adding 10 g of a 50% aqueous solution of the product of Example 2 to a concrete consisting of water, 260 g (12.25%); cement, Portland type I, 500 g (23.55%); and Ottawa Sand 1,363 g (64.20%).

Example 5

An aqueous emulsion is prepared by the following procedure. To a beaker add: 95.3 of the product of Example 1, 3.0 g of an amine-functional polyamide resin based on dimer fatty acid (available from Henkel Corporation, Ambler, Pennsylvania, as GENAMID® 490), 2.0 g tri-lauryl amine (available from Henkel Corporation, Tucson, Arizona, as ALAMINE® 304-1), and 100 g of a surfactant solution (prepare surfactant solution by adding 0.78 g PLURONIC® F-88 nonionic block copolymer of propylene and ethylene oxides having an HLB of 24.0 available from BASF Performance Chemicals, Parsippany, N.J. in 881 g deionized water). The mixture is emulsified using a high shear homogenizer.

Example 6

A concrete can be made by adding 10 g of a 50% aqueous emulsion of Example 5 to a concrete consisting of water, 260 g (12.25%); cement, Portland type I, 500 g (23.55%); and Ottawa Sand 1,363 g (64.20%).

Example 7

An aqueous emulsion is prepared by the following procedure. To a beaker add: 95.3 g of the product of Example 2, 3.0 g of an amine-functional amidoamine resin (available from Henkel Corporation, Ambler, Pa., as GENAMID 490), 2.0 g tri-lauryl amine (available from Henkel Corporation, Tucson, Ariz., as Alamine 304-1), and 100 g of a surfactant solution (prepare surfactant solution by adding 0.78 g of nonionic block copolymer of propylene and ethylene oxides having an HLB of 24.0, available from BASF Corp. as PLURONIC F-88, in 881 g deionized water). The mixture is emulsified using a high shear homogenizer.

Example 8

A concrete can be made by adding 10 g of a 50% aqueous emulsion of Example 7 to a concrete consisting of water, 260 g (12.25%); cement, Portland type I, 500 g (23.55%); and Ottawa Sand 1,363 g (64.20%).

Example 9

Rebar (diameter of 1 cm) was wire brushed to remove any corrosion products, rinsed with deionized water, cleaned in an ultrasonic bath to remove any dust adhering from the wire brushing, and washed with acetone to remove any organic oils. The ends of the bar are then coated with sealing wax to expose a fixed surface area for corrosion testing. Concrete mixtures are then prepared according to ASTM C305, practice for mechanical mixing of hydraulic cement pastes and mortars of plastic consistency. "Lollipop" specimens are cast with both treated (1% w/w activities of admixture vs. cement) and untreated concrete. The prepared rebar is mounted (suspended) in the middle of a, 5 cm (diameter) by 10 cm, cylindrical mold, this geometry provides nearly a 1 inch cover of concrete on all sides to the rebar. The concrete is cured at room temperature (approximately 23° C.) at approximately 100% RH for seven days.

Each specimen is then ponded in a 1.5% (w/w) sodium chloride solution for two weeks prior to electrochemical testing by means of a potentiodynamic technique. EG&G Instruments, Princeton Applied Research Division, hardware (models 273, 273A, or VersaStat™) and software (252 or 352) were used. The electrolyte was the 1.5% (w/w) NaCl solution, the working electrode the steel reinforcing bar embedded in concrete, the counter electrode was a high density carbon electrode, the reference electrode calomel electrode in a luggin probe. The potentiodynamic scan was from −0.250 volts versus the open circuit potential to 1.0 volt versus the reference electrode. The equilibrium corrosion potential ($E_{corr}$) and corrosion current density ($i_{corr}$) were determined. The more positive the values of $E_{corr}$ indicate that corrosion is less likely to thermodynamically occur. The equilibrium corrosion current density indicates the kinetic rate of corrosion, the lower the value of $i_{corr}$ the smaller the rate of corrosion. The following data shows that the aminoamide formulation of Example 1 protects the reinforcing bar embedded in concrete and exposed to high chloride ion levels thermodynamically ($E_{corr}$) and kinetically ($i_{corr}$) protects the steel from corrosion attack compared to (purified) calcium nitrite, a commercial comparative, and an untreated control.

| Admixture | $E_{corr}$(millivolts) | $i_{corr}(10^{-5}$ amps/cm$^2$) |
|---|---|---|
| Example 1 | −413 | 3.38 |
| Calcium Nitrite | −517 | 3.86 |
| Commercial Comparative | −456 | 4.06 |
| Untreated (control) | −446 | 4.26 |

Example 10

Charge a 0.5 liter resin kettle, fitted with a mechanical stirrer, a thermocouple, and a distilling receiver with a condenser, with 86.5 g of DuPont DBE-3 (89 wt % dimethyl adipate, 10 wt % dimethyl glutarate, 0.2 wt % dimethyl succinate, and 0.05 wt % methanol, and 0.04 wt % water) and 103.3 g diethylenetriamine. Maintain a dry nitrogen gas atmosphere over the reaction mixture. Heat the mixture up to reflux (approximately 150° C.) and hold at reflux, the reflux temperature will decrease as the reactants are converted to products. After approximately 20 minutes of reflux, begin collecting the methanol distillate. The temperature of the reaction mixture will rise as the methanol is collected, maintain the reaction temperature so as not to exceed 150° C. Typically 22.34 grams of the theoretically excepted methanol can be collected by a simple distillation, the remaining 15.46 grams can be collected by either a nitrogen sweep or reduced pressure distillation. After the methanol has been collected, the product is allowed to cool to between 105° C. and 120° C. and 0.34 gram of solid nonionic block copolymer of propylene and ethylene oxides having an HLB of 24.0 PLURONIC® F-88, available from BASF Performance Chemicals, Parsippany, N.J.) is added to the product with mixing. The mixture is allowed to cool just below 100° C. and 165 grams of water are then added dropwise. After the addition of the water, the resulting aqueous solution is near ambient temperature. Then, 4.7 g of an amine-functional amidoamine resin (available from Henkel Corporation, Ambler, Pa., as GENAMID 490), 3.2 g tri-lauryl amine (available from Henkel Corporation, Tucson, Ariz., as Alamine 304-1) are added separately, aech at a rate of about 0.1 ml/minute. The final product should be a hazy liquid with a parrticle size of 10 micrometers or less.

What is claimed is:

1. A method for making a corrosion inhibitor useful in cementitious compositions comprising mixing a major amount by weight of an amidoamine, said amidoamine being a reaction product of a polyalkylenepolyamine and at least one short-chain alkanedioic acid having 2 to 14 carbon atoms or a reactive derivative thereof, with a minor amount by weight of a surfactant, the resulting mixture being at an elevated temperature of about 100° C. to about 120° C. during said mixing.

2. A method as claimed in claim 1 wherein said amidoamine is the reaction product of a polyalkylenepolyamine and a short-chain alkanedioic acid, or reactive derivative therof, in a molar ratio of polyalkylenepolyamine to short-chain alkanedioic acid, or reactive derivative thereof, of greater than 1.4:1.

3. A method as claimed in claim 1 wherein said reaction product is comprised of an amidoamine represented by the formula:

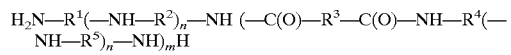

wherein $R^1$, $R^2$, $R^3$, $R^4$, and $R^5$ are alkylene radicals and n and m are independently selected from about 1 to about 20.

4. A method as claimed in claim 3 wherein n and m are independently selected from about 1 to about 5.

5. A method as claimed in claim 3 wherein the reaction product is at least 50% by weight of amidoamines of the said formula.

6. A method as claimed in claim 1 wherein said polyalkylenepolyamine has the formula $H_2N-R(-NH-R)_n-NH_2$ wherein n is 1 to 20, R is an alkylene group having from about 2 to about 8 carbon atoms.

7. A method as claimed in claim 6 wherein the total carbon atoms of said polyalkylenepolyamine do not exceed 12.

8. A method as claimed in claim 6 wherein n is from 1 to 5.

9. A method as claimed in claim 1 wherein said polyalkylenepolyamine is selected from the group consisting of diethylenetriamine, triethylenetetramine, tetraethylenepentamine, pentaethylenehexamine, dipropylenetriamine, tributylenetetramine, and dihexamethylenetriamine.

10. A method as claimed in claim 1 wherein said polyalkylenepolyamine is selected from the group consisting of triethylenetetramine and diethylenetriamine.

11. A method as claimed in claim 1 wherein said short-chain alkanedioic acid or reactive derivative thereof, is selected from the group consisting of alkanedioic acids having less than about 14 carbon atoms and di-$C_1$–$C_3$ alkyl esters thereof.

12. A method as claimed in claim 11 wherein said short-chain alkanedioic acid has from 3 to 10 carbon atoms.

13. A method as claimed in claim 11 wherein said short-chain alkanedioic acid has from 4 to 8 carbon atoms.

14. A method as claimed in claim 11 wherein said short-chain alkanedioic acid is selected from the group consisting of succinic, glutaric and adipic acids.

15. A method as claimed in claim 1 wherein said short-chain alkanedioic acid or reactive derivative thereof is selected from the group consisting of $C_{1-3}$ alkyl diesters of $C_{1-10}$ dicarboxylic acids.

16. A method as claimed in claim 1 wherein said short-chain alkanedioic acid or reactive derivative thereof is selected from the group consisting of dimethyl malonate, dimethyl succinate, dimethyl glutarate, dimethyl adipate, dimethyl pimelate, dimethyl azelate, and dimethyl sebacate.

17. A method as claimed in claim 1 wherein said short-chain alkanedioic acid or reactive derivative thereof is a mixture of dimethyl adipate and dimethyl glutarate.

18. A method as claimed in claim 1 wherein said amidoamine is the reaction product of a polyalkylenepolyamine and a short-chain alkanedioic acid, or reactive derivative thereof, in a molar ratio of polyalkylenepolyamine to short-chain alkanedioic acid, or reactive derivative thereof, of from about 1.3:1 to about 4:1.

19. A method as claimed in claim 1 wherein said amidoamine is the reaction product of a polyalkylenepolyamine and a short-chain alkanedioic acid, or reactive derivative thereof, in a molar ratio of polyalkylenepolyamine to short-chain alkanedioic acid, or reactive derivative thereof, of from about 1.5:1 to about 3:1.

20. A method as claimed in claim 1 wherein said amidoamine is the reaction product of a polyalkylenepolyamine and a short-chain alkanedioic acid, or reactive derivative thereof, in a molar ratio of polyalkylenepolyamine to short-chain alkanedioic acid, or reactive derivative thereof, of from about 1.5:1 to about 2.5:1.

21. A method as claimed in claim 1 wherein said elevated temperature is from about 105° C. to about 120° C.

22. A method as claimed in claim 1 wherein said surfactant is a nonionic surfactant.

23. A method as claimed in claim 1 wherein said surfactant is a block copolymer of ethylene oxide and propylene oxide wherein the molecular weight of the polyoxypropylene hydrophobe is from about 950 to 4000, and wherein the polyoxyethylene hydrophobe is from about 10% to 80% by weight of the copolymer.

24. A method as claimed in claim 1 wherein said surfactant is a block copolymer of ethylene oxide and propylene oxide wherein the molecular weight of the polyoxypropylene hydrophobe is from about 1750 to about 3250 and wherein the polyoxyethylene hydrophobe is from about 30% to 80% by weight of the copolymer.

25. A method as claimed in claim 1 wherein said surfactant is present in an amount of from about 0.01% to about 5% by weight of the amidoamine.

26. A method as claimed in claim 1 wherein said surfactant is present in an amount of from about 0.05% to about 1% by weight of the amidoamine.

27. A method as claimed in claim 1 further comprising diluting the resulting mixture with water and adding a hydrophobe to the resulting diluted mixture.

28. A method as claimed in claim 27 wherein said hydrophobe is comprised of a member selected from the group consisting of mono-, di-, and tri-alkyl amines.

29. A method as claimed in claim 28 wherein said amine has at least about 12 total carbon atoms.

30. A method as claimed in claim 28 wherein said hydrophobe is comprised of a tri-alkyl fatty amine wherein each fatty alkyl group has at least 6 carbon atoms.

31. A method as claimed in claim 28 wherein said hydrophobe is comprised of a tri-alkyl fatty amine wherein each fatty alkyl group has from about 8 to about 22 carbon atoms each.

32. A method as claimed in claim 28 wherein said hydrophobe is comprised of a tri-alkyl fatty amine wherein each fatty alkyl group has from about 10 to about 14 carbon atoms each.

33. A method as claimed in claim 27 wherein said hydrophobe is comprised of the reaction product of a polymeric fatty acid, a fatty mono-acid, and a polyalkylenepolyamine.

34. A method as claimed in claim 33 wherein said polymeric fatty acid is comprised predominantly of a $C_{36}$ dimer acid.

35. A method as claimed in claim 33 wherein said reaction product is a liquid fatty polyamide with an amine number of from about 200 to about 600.

36. A method as claimed in claim 33 wherein said reaction product is a liquid fatty polyamide with an amine number of from about 300 to about 500.

37. A method as claimed in claim 33 wherein said reaction product is a liquid fatty polyamide with an amine number of from about 350 to about 400.

38. A method as claimed in claim 27 wherein said hydrophobe is present in an amount of from about 0.01% to about 40% by weight of the amidoamine.

39. A method as claimed in claim 27 wherein said hydrophobe is present in an amount of from about 0.1% to about 10% by weight of the amidoamine.

40. A method as claimed in claim 27 wherein said hydrophobe is present in an amount of from about 1% to about 5% by weight of the amidoamine.

41. A method of making a corrosion inhibitor useful in hydranlic cementitious compositions comprising:
    mixing an amidoamine, said amidoamine being a reaction product of a polyalkylenepolyamine and a short-chain alkanedioic acid or reactive derivative thereof, with a nonionic surfactant in an amount of from about 0.05% to about 1% by weight of said amidoamine, the resulting mixture being at a temperature of about 100° C. to about 120° C. during said mixing, adding water to the resulting mixture, and adding to said resulting mixture a tri-alkyl fatty amine wherein each fatty alkyl group has from about 8 to about 22 carbon atoms, and the reaction product of a polymeric fatty acid, a fatty mono-acid, and a polyalkylenepolyamine.

42. A method as claimed in claim 41 wherein said amidoamine is the reaction product of a polyalkylenepolyamine selected from the group of polyalkylenepolyamines having the formula $H_2N—R(—NH—R)_n—NH_2$ wherein n is 1 to 20 and R is an alkylene group having from about 2 to about 8 carbon atoms, and a short-chain alkanedioic acid or reactive derivative thereof, selected from the group consisting of alkanedioic acids having less than about 22 carbon atoms and di-$C_1$–$C_3$ alkyl esters thereof, in a molar ratio of from about 1.3:1 to about 4:1.

43. A method as claimed in claim 42 wherein said polyalkylenepolyamine is selected from the group consisting of triethylenetetramine and diethylenetriamine and said short-chain alkanedioic acid or reactive derivative thereof, is selected from the group consisting of alkanedioic acids having about 4–8 carbon atoms and di-$C_1$–$C_3$alkyl esters thereof.

44. A method of making a corrosion inhibitor useful in hydraulic cementitious compositions comprising mixing a major amount by weight of an amidoamine having the formula:

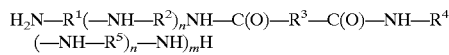

wherein $R^1$, $R^2$, $R^3$ $R^4$, and $R^5$ are alkylene radicals and n and m are independently selected from about 1 to about 20, with a minor amount by weight of a surfactant comprising a block copolymer of ethylene oxide and propylene oxide wherein said amidoamine is the reaction product of a polyalkylenepolyamine and at least one short chain alkanedioic acid having from about 2 to 14 carbon atoms or a reactive derivative thereof, and said block copolymer has a polyoxypropylene hydrophobic group and a polyoxyethylene hydrophilic group, said polyoxypropylene hydrophobic group having a molecular weight of about 950 to 4000 and said polyoxyelthylene hydrophilic group comprising about 10 to 80% by weight of the copolymer the resulting mixture being at an elevated temperature of about 100° C. to about 120° C.

\* \* \* \* \*

UNITED STATES PATENT AND TRADEMARK OFFICE
CERTIFICATE OF CORRECTION

PATENT NO. : 5,891,364
DATED : April 6, 1999
INVENTOR(S) : Michael J. Incorvia et al.

Page 1 of 2

It is certified that error appears in the above-indentified patent and that said Letters Patent is hereby corrected as shown below:

Column 10, claim 1, line 46, the word --hydraulic-- should be inserted before "cementitious".

Column 10, claim 1, line 52, the phrase --of a block copolymer of ethylene oxide and propylene oxide, said copolymer having a hydrophobic group and a polyoxyethylene hydrophilic group-- should be inserted after the word "surfactant".

Column 10, claim 2, line 57, the term "therof" should be --thereof--.

Column 12, claim 23, line 5, the term "hydrophobe" should be --hydrophile--.

Column 12, claim 24, line 11, the term "hydrophobe" should be --hydrophile--.

UNITED STATES PATENT AND TRADEMARK OFFICE
CERTIFICATE OF CORRECTION

PATENT NO. : 5,891,364
DATED : April 6, 1999
INVENTOR(S) : Michael J. Incorvia et al.

It is certified that error appears in the above-indentified patent and that said Letters Patent is hereby corrected as shown below:

Column 12, claim 41, line 64, the term "hydranlic" should be --hydraulic--.

Signed and Sealed this

Fifth Day of October, 1999

Attest:

Attesting Officer

Q. TODD DICKINSON

Acting Commissioner of Patents and Trademarks